US006178693B1

(12) United States Patent
Hunt

(10) Patent No.: US 6,178,693 B1
(45) Date of Patent: Jan. 30, 2001

(54) ADJUSTABLE PUPPY GATE

(76) Inventor: Susan R. Hunt, 312 Kamp Way, Redding, CA (US) 96003

( * ) Notice: Under 35 U.S.C. 154(b), the term of this patent shall be extended for 0 days.

(21) Appl. No.: 09/447,795

(22) Filed: Nov. 23, 1999

(51) Int. Cl.[7] ............................. E06B 11/02; E06B 3/06; E06B 9/00
(52) U.S. Cl. ................................. 49/50; 49/57; 49/447; 49/63; 160/222; 160/227
(58) Field of Search .................... 49/50, 55, 57, 49/463, 449, 450, 61, 63; 160/221, 222, 224, 227; 119/484, 498, 501, 506, 510

(56) References Cited

U.S. PATENT DOCUMENTS

| | | |
|---|---|---|
| 1,132,438 | 3/1915 | Carr . |
| 1,776,833 * | 9/1930 | Huckler ................................ 160/184 |
| 2,195,291 * | 3/1940 | Zukor .................................. 340/545.8 |
| 2,317,312 * | 4/1943 | Swanson et al. ...................... 49/130 |
| 2,317,686 * | 4/1943 | Kuyper ................................ 160/101 |
| 2,598,817 * | 6/1952 | Mohring ................................ 49/367 |
| 3,016,878 | 1/1962 | Kallal . |
| 3,129,470 * | 4/1964 | Schneider ............................ 49/450 |
| 3,224,048 * | 12/1965 | Sullivan .................................. 49/57 |
| 3,861,359 | 1/1975 | Pals . |
| 4,437,265 * | 3/1984 | Turro et al. ............................. 49/57 |
| 4,465,262 * | 8/1984 | Itri et al. ................................. 256/24 |
| 4,475,311 * | 10/1984 | Gibson ................................. 49/176 |
| 4,572,109 | 2/1986 | Nixon . |
| 4,624,072 * | 11/1986 | Zilkha ..................................... 49/55 |
| 4,677,791 | 7/1987 | Larson et al. . |
| 5,185,954 | 2/1993 | Waddle, Sr. . |
| 5,396,732 | 3/1995 | Andersen . |
| 5,461,827 * | 10/1995 | Lofton ..................................... 49/55 |
| 5,797,218 | 8/1998 | Holland . |

FOREIGN PATENT DOCUMENTS 2 110 296   6/1983 (GB) .

* cited by examiner

Primary Examiner—Daniel P. Stodola
Assistant Examiner—Gregory J. Strimbu
(74) Attorney, Agent, or Firm—Richard C. Litman

(57) ABSTRACT

An adjustable gate including a frame having opposing vertical stiles each with a vertical groove therein, an upper gate section and a lower gate section. The upper gate section can be lowered such that only an adult dog may pass through the gate while preventing the passage of puppies. The upper gate section includes an upper crossbar with ends which slide within the vertical grooves of the stiles. Both the upper gate section and the lower gate section have a plurality of evenly spaced vertical slats. The slats of the upper gate section telescopingly or slidingly engage the slats of the lower gate section when the upper gate section is lowered.

10 Claims, 3 Drawing Sheets

ADJUSTABLE PUPPY GATE

BACKGROUND OF THE INVENTION

1. Field of the Invention

The present invention relates generally to gates. More specifically, the invention relates to a two-section pet gate having a vertically slidable upper section and a stationary lower section for controlling the union and separation of a female dog and her puppies during the weaning period.

2. Description of the Related Art

The related art of interest describes various gates, but none discloses the two-section gate of the present invention placed in a doorway. There is a need for separation of an economical gate into sections to permit the selective separation of a female dog from her puppies during the weaning period. The relevant art of interest will be discussed in the perceived order of relevance to the present invention.

U.S. Pat. No. 3,016,878 issued on Jan. 16, 1962, to Vincent J. Kallal describes an automatic hog gate which will permit movement in one direction or both directions through the gate or prevent movement in either direction through the gate. The upper gate portion has intermediate sleeves and flanged upstanding members support vertical tubular bars ending in rubber extensions and telescopes into the lower gate portion's tubular side members. The gate can pivot in and out on brackets on the fence posts holding the gate. A bottom lock bar hinged on one side to a fence post is provided. The hog gate is distinguishable for its bottom rubber members and swinging gate structure.

U.S. Pat. No. 5,185,954 issued on Feb. 16, 1993, to Richard L. Waddle, Sr. describes a pet portal device for use with a sliding door kept ajar and mounted on a sliding door frame to permit opening by hinges with a bottom portal for a pet. The pet portal device is distinguishable for its limitation to a sliding door enclosure.

U.S. Pat. No. 5,797,218 issued on Aug. 28, 1998, to Matthew W. Holland describes an adjustable and removable safety gate mounted to the jambs of a doorway. A gate portion has horizontal telescopic tubular members and two L-shaped brackets or hooks on the left side which are inserted in sleeves positioned on the left side door jamb mount. The gate portion has a mesh screen. The door jamb mounts have a telescopic and horizontal bottom tube joining them and outside mounting knobs at their top regions pivoting in circular disks mounted on the door jambs to enable pivoting of the assembly. The safety gate is distinguishable for its pivoting structure.

U.S. Pat. No. 5,396,732 issued on Mar. 14, 1995, to Finn Andersen describes a removable metal safety barrier for positioning between two walls by barrier securing means or flat-headed bolts on the four ends of the barrier. An inverted T-shaped frame supports a lockable gate with vertical bars. The removable gate is distinguishable for its conventional gate structure.

U.S. Pat. No. 4,677,791 issued on Jul. 7, 1987, to Donald A. Larson et al. describes a child/pet adjustable stairwell gate comprising two sliding gate sections, wherein one gate section is hung on a wall having two U-shaped plastic brackets holding a pair of rubber bumpers on one vertical edge. The other gate section is similarly hung on another post of a wrought iron railing by a pair of brackets and bumpers. The sliding gate is distinguishable for its horizontal folding structure.

U.S. Pat. No. 4,572,109 issued on Feb. 25, 1986, to Edward T. Nixon describes an animal separator gate which allows quick separation of animals by both height and width. An inverted U-shaped tubular metal frame is welded to a channel beam base. The large animal gate has a bottom section which has wide vertical bars while the smaller gate has one horizontal bar. The large door pivots on the frame while the small door pivots on the large door. For selective passage of small animals, the large door is pivoted open. The animal separator gate is distinguishable for its pivoting gates.

U.S. Pat. No. 3,861,359 issued on Jan. 21, 1975, to Robert Pals describes a hog sorter gate device which is placed between fence posts and utilizes a crankshaft mechanism to permit only one-way swinging of a rectangular door. A pair of upright bars are adjustable in width for selective passage by size. The hog sorter gate device is distinguishable for its swinging rectangular door and expandable opening.

U.S. Pat. No. 1,132,438 issued on Mar. 16, 1915, to Joseph R. Carr describes a main swinging gate in a frame with a side door having a smaller gate raised by a rope and pulley system. The lift gate is distinguishable for its required pulley system.

British Patent Application No. 2,110,296 published on Jun. 15, 1983, for Arthur M. Hawkins et al. describes a tubular metal gate made from welded tubular metal bars suspended and rotatable on a tubular post containing the counterweight attached by a line to the gate. The gate is distinguishable for its swinging aspect.

None of the above inventions and patents, taken either singularly or in combination, is seen to describe the present invention as claimed. Thus, a adjustable puppy gate solving the aforementioned problems is desired.

SUMMARY OF THE INVENTION

The present invention provides an adjustable puppy gate positioned in a doorway having two sections of different heights. The gate provides for the passage of the mother by lowering the upper gate while preventing the passage of the puppies.

Accordingly, it is a principal object of the invention to provide an adjustable puppy gate which preferentially permits the mother dog to exit but not the puppies with an upper gate section adapted to be lowered.

It is another object of the invention to provide an adjustable puppy gate which has a lower gate section which is fixed.

It is a further object of the invention to provide as a first embodiment an adjustable puppy gate with an upper section having hollow slats which lower over corresponding slats of the lower puppy gate portion.

Still another object of the invention is to provide as a second embodiment an adjustable puppy gate with an upper section with solid flexible slats overlapping the puppy gate portion to prevent the mother dog from entering.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
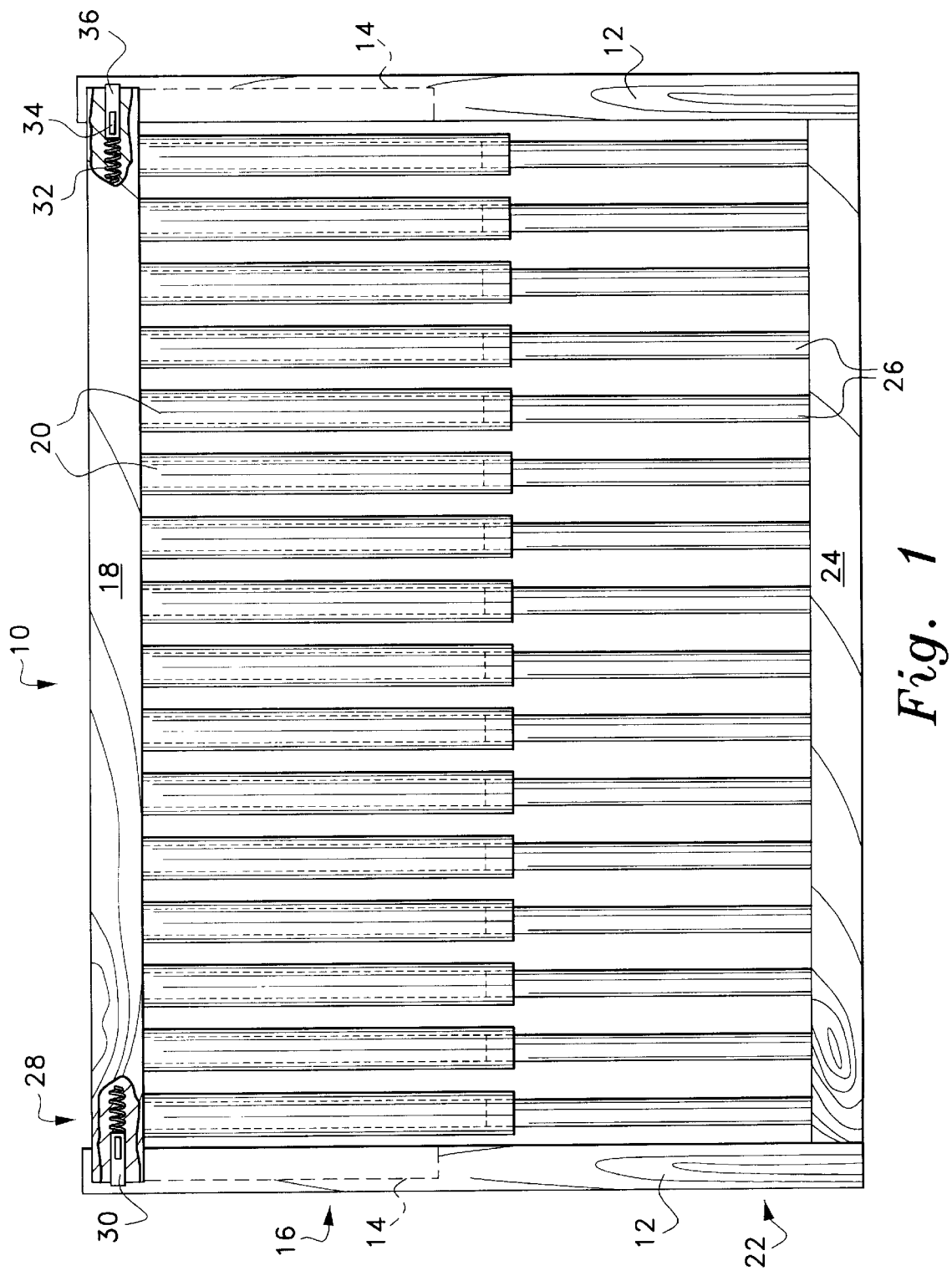
FIG. 1 is a front elevational view of a first embodiment of an adjustable puppy gate having hollow upper slats and partially broken away to show the latches in the upper gate section according to the present invention.

In FIG. 1, a first embodiment of the present invention is directed to a puppy gate 10 which prevents puppies from exiting and a mother dog from entering during the weaning period. The mother dog is permitted to enter once or twice a day to join her puppies. The puppy gate 10 can be installed in a doorway and still permit people to pass over the puppy gate.

A rectangular frame comprises two fixed stiles 12 having metal lined vertical grooves or keyways 14 on one side of the stiles. An upper gate section 16 comprises an upper crossbar 18 having ends which are configured to slide within the vertical grooves 14 of the two fixed stiles 12, and from which crossbar 18 extends a plurality of evenly spaced, e.g., approximately 1 in. apart, hollow cylindrical vertical slats 20.

A lower gate section 22, approximately 5–10 inches high, comprises a bottom crossbar 24 having ends which are fixed to the two fixed stiles 12. From crossbar 24 a plurality of vertical solid cylindrical slats 26 extends upwardly and coincidently with the slats 20 of the upper gate section 16.

The upper gate section 16 is lowered over the lower gate section 22 to permit the mother dog to visit her puppies. When the mother is let out, the upper gate section is raised and locked in the raised position by a latch mechanism 28. The latch 28 comprises a lock bar 30 driven by a compression spring 32 inserted in each end of the upper crossbar 18. Each lock bar 30 has a knob 34 for releasing the bar from the notch 36 in each stile 12.

The gate 10 is preferably made of wood except for the metal lining in the grooves or keyways 14 and the latch mechanism 28. However, the entire gate 10 can be made of metal and/or plastic.

Figure 2:
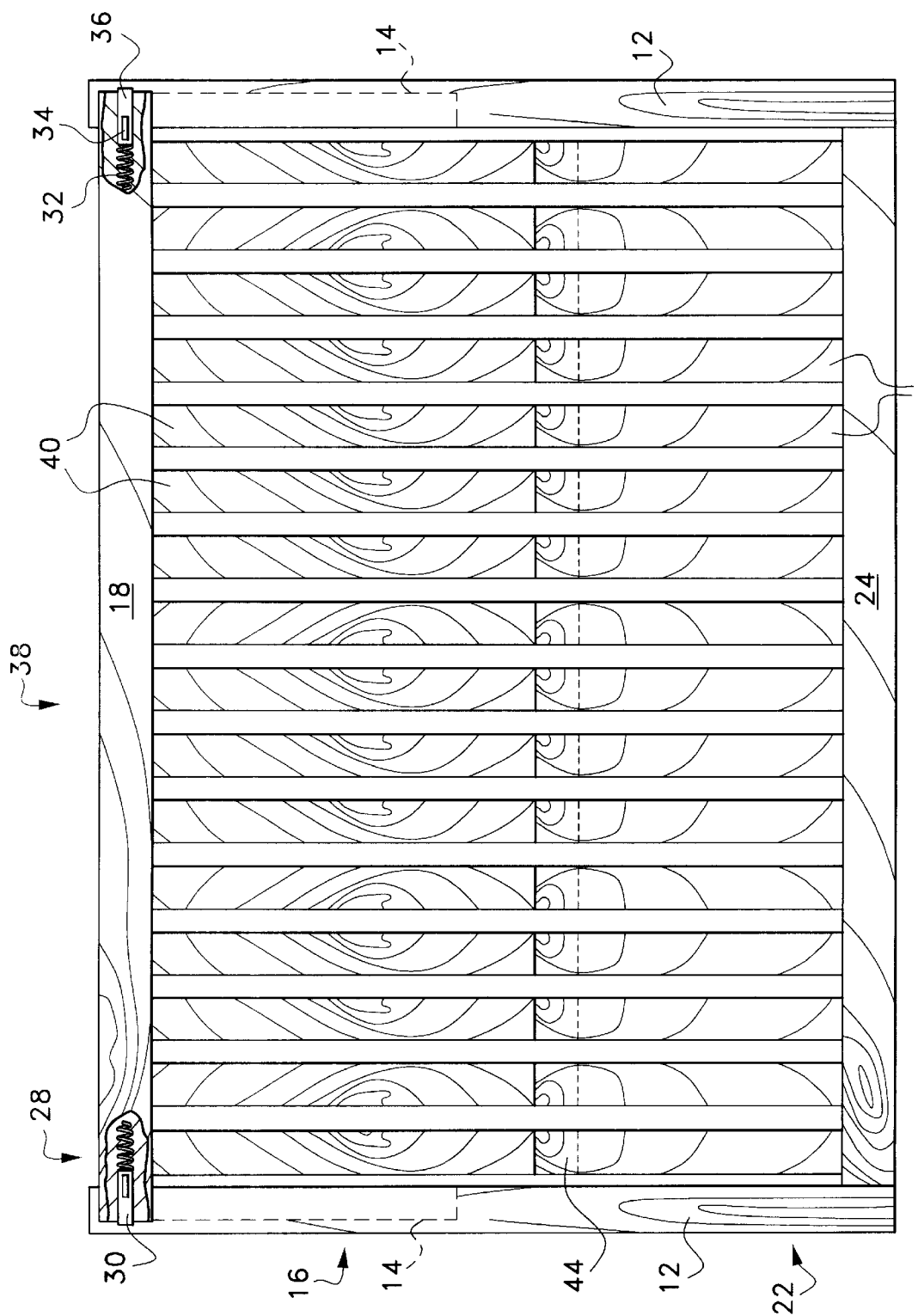
FIG. 2 is a front elevational view of a second embodiment of an adjustable puppy gate having flexible solid upper slats and partially broken away to show the latches in the upper gate section according to the present invention.
Figure 3:
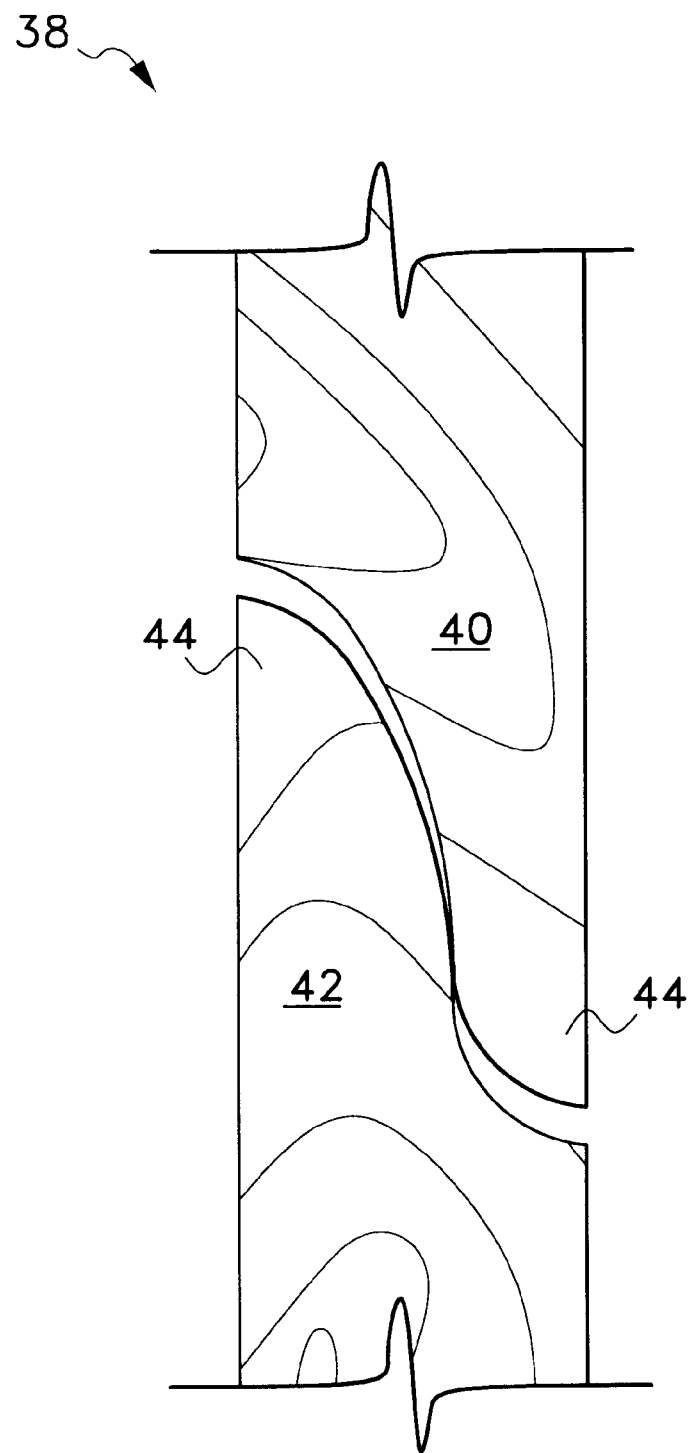
FIG. 3 is a partial side elevational view of the second embodiment showing the abutting sloped ends of the solid slats for preventing the mother dog from entering.

Turning to the second embodiment illustrated in FIGS. 2 and 3, this puppy gate 38 has the same configuration except that the upper flexible wooden slats 40 and the lower flexible wooden slats 42 are both solid and have tips 44 which are beveled enabling the upper slats 40 to slide in back of the lower slats 42 (FIG. 3). The remaining parts of the puppy gate 38 have been identified in the description of the FIG. 1 device. Again, puppy gate 38 can alternatively be made of metal and/or plastic.

These gates have been used for Pomeranian dogs which are small and compact. Therefore, larger dogs can be accommodated by higher gates.

It is to be understood that the present invention is not limited to the embodiments described above, but encompasses any and all embodiments within the scope of the following claims.

I claim:

1. An adjustable puppy gate comprising:
   a frame including two fixed stiles, each of said stiles having a vertical groove on one side thereof;
   an upper gate section including an upper crossbar having ends, each of the ends being configured to slide within a respective one of said vertical grooves, said upper crossbar having a plurality of evenly spaced vertical slats depending therefrom;
   a lower gate section including a bottom crossbar having ends fixed between the two fixed stiles, said bottom crossbar having a plurality of vertical slats extending upwardly therefrom; and
   wherein the slats of the upper gate section are hollow and configured to slip over the slats of the lower gate section;
   whereby the upper gate section can be lowered to permit passage of dogs above a predetermined size while barring passage of dogs smaller than said predetermined size.

2. The adjustable puppy gate according to claim 1, wherein each said vertical groove is lined with metal.

3. The adjustable puppy gate according to claim 1, wherein the ends of the upper crossbar have extendible metal members under compression for latching the upper gate section in a locked position.

4. The adjustable puppy gate according to claim 1, wherein the slats of each said gate section are spaced less than 1 inch apart from one another.

5. The adjustable puppy gate according to claim 1, wherein the slats and stiles are made of wood.

6. An adjustable puppy gate comprising:
   a frame including two fixed stiles, each of said stiles having a vertical groove on one side thereof;
   an upper gate section including an upper crossbar having ends, each of the ends being configured to slide within a respective one of said vertical grooves, said upper crossbar having a plurality of evenly spaced vertical slats depending therefrom, wherein each of said slats has a tip;
   a lower gate section including a bottom crossbar having ends fixed between the two fixed stiles, said bottom crossbar having a plurality of vertical slats extending upwardly therefrom, wherein each of said slats of said lower gate section has a tip; and
   wherein each said tip of the upper gate section and each said tip of the lower gate section are bevelled to enable the slats in the upper gate section to slip behind the slats in the lower gate section;
   whereby the upper gate section can be lowered to permit passage of dogs above a predetermined size while barring passage of dogs smaller than said predetermined size.

7. The adjustable puppy gate according to claim 6, wherein the slats of each said gate section are spaced less than 1 inch apart from one another.

8. The adjustable puppy gate according to claim 6, wherein each said vertical groove is lined with metal.

9. The adjustable puppy gate according to claim 6, wherein the ends of the upper crossbar have extendible metal members under compression for latching the upper gate section in a locked position.

10. The adjustable puppy gate according to claim 6, wherein the slats and stiles are made of wood.

* * * * *